(12) United States Patent
Li et al.

(10) Patent No.: US 9,380,522 B2
(45) Date of Patent: Jun. 28, 2016

(54) METHOD AND APPARATUS FOR CELL SEARCH IN SENSOR SYSTEM

(71) Applicant: China Academy of Telecommunications Technology, Beijing (CN)

(72) Inventors: Yuanyuan Li, Beijing (CN); Wenling Bai, Beijing (CN); Chenggang Jiang, Beijing (CN); Yu Yang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/415,128

(22) PCT Filed: Jul. 11, 2013

(86) PCT No.: PCT/CN2013/079176

§ 371 (c)(1),
(2) Date: Jan. 15, 2015

(87) PCT Pub. No.: WO2014/012453

PCT Pub. Date: Jan. 23, 2014

(65) Prior Publication Data

US 2015/0173003 A1    Jun. 18, 2015

(30) Foreign Application Priority Data

Jul. 17, 2012   (CN) .......................... 2012 1 0248186

(51) Int. Cl.
| | | |
|---|---|---|
| H04W 48/16 | (2009.01) | |
| H04W 16/14 | (2009.01) | |
| H04W 72/02 | (2009.01) | |
| H04W 72/04 | (2009.01) | |
| H04W 72/10 | (2009.01) | |
| H04W 84/18 | (2009.01) | |
| H04W 88/06 | (2009.01) | |

(52) U.S. Cl.
CPC .............. *H04W 48/16* (2013.01); *H04W 16/14* (2013.01); *H04W 72/02* (2013.01); *H04W 72/0453* (2013.01); *H04W 72/10* (2013.01); *H04W 84/18* (2013.01); *H04W 88/06* (2013.01)

(58) Field of Classification Search
CPC combination set(s) only.
See application file for complete search history.

(56) References Cited

U.S. PATENT DOCUMENTS

2012/0039284 A1*  2/2012  Barbieri et al. ............... 370/329

FOREIGN PATENT DOCUMENTS

| CN | 102196452 A | 9/2011 |
| CN | 102355671 A | 2/2012 |
| WO | 2011/063845 A1 | 6/2011 |

OTHER PUBLICATIONS

International Search Report and Written Opinion for PCT/CN2013/079176.
Extended European Search Report issued on Jun. 16, 2015 in the EP counterpart application (13819292.7).
The Office Action issued on Dec. 9, 2015 in the CN counterpart application (201210248186.3).

* cited by examiner

*Primary Examiner* — Kabir A Timory

(74) *Attorney, Agent, or Firm* — Kilpatrick Townsend & Stockton LLP

(57) ABSTRACT

Embodiments of the present application relate to the field of wireless communications, and in particular, to a method and an apparatus for cell search in a sensor system, used for solving the problem in the prior art that an operation time delay is long in cell selection and cell residence. The method of the embodiments of the present application comprises: a terminal determining different types of frequency points in frequency points supported by the sensor system, the frequency points of the sensor system being divided, in a diminishing sequence of priorities, into a first type of authorization frequency point, a first type of non-authorization frequency point, a second type of authorization frequency point and a second type of non-authorization frequency point; and performing, in a diminishing sequence of priorities, cell search and cell residence on the frequency points supported by the sensor system. With the present application, a suitable cell can be selected fast and accurately to perform residence, thereby reducing the operation time delay in cell selection and cell residence after a terminal is started, and improving user experience.

16 Claims, 5 Drawing Sheets

METHOD AND APPARATUS FOR CELL SEARCH IN SENSOR SYSTEM

This application is a U.S. National Stage of International Application No. PCT/CN2013/079176, filed on Jul. 11, 2013, designating the United States and claiming the priority of Chinese Patent Application No. 201210248186.3, filed with the Chinese Patent Office on Jul. 17, 2012 and entitled "Method of and device for searching for cell in cognitive system", the content of which is hereby incorporated by reference in its entirety.

FIELD

The present application relates to the field of wireless communications and particularly to a method of and device for searching for a cell in a cognitive system.

BACKGROUND

Radio communication spectrums are precious natural resources, and the scarcity of the spectrum resources has been increasingly serious along with rapid development of wireless communication technologies. As adopted in wireless communication networks, spectrums are fixedly allocated at present, resulting in that spectrum resources allocated to some system heavily loaded with traffic are not sufficient while spectrum resources occupied by some system lightly loaded with traffic are excessive, thus failing to efficiently use the fixedly allocated spectrum resources. The technology of Cognitive Radio (CR) has emerged in response to a need to improve the utilization ratio of the spectrum resources.

A principle of the technology of cognitive radio lies in that: given no interference to an authorized system, a change in current radio communication environment is detected intelligently to select dynamically a blank frequency of the authorized system for communication so as to address the existing problem of unreasonable utilization of the spectrum resources due to fixed allocation of the spectrums. The blank frequency refers to an idle frequency allocated to the authorized system. With the technology of cognitive radio, an access system, capable of communication using an idle radio communication spectrum allocated to the authorized system, is referred to as a cognitive system.

A blank frequency may be discovered and used by a plurality of cognitive systems, so in a currently common mechanism, a cognitive system at a low priority concedes actively to a cognitive system at a high priority, that is, when the cognitive system at a high priority communicates at some blank frequency, the cognitive system at a low priority can use the blank frequency when the blank frequency is out of use by the cognitive system at a high priority, or the cognitive system at a low priority may concede from the spectrum resource when the cognitive system at a high priority needs to use the spectrum resource. As can be apparent, the blank frequency typically varies dynamically, and an operating frequency of the cognitive system may also vary therewith, thereby an access system at a frequency also varies dynamically.

A terminal needs to search for a cell after being powered on, and if prior information is stored in the terminal (the prior information includes at least information about a frequency previously used by the terminal), then the terminal searches for a cell preferentially at the frequency in the prior information, and if there is an appropriate cell detected, then the terminal may select and reside at the cell; and if there are a plurality of frequencies in the prior information, then the terminal may firstly measure power at the frequencies and then perform operations, such as downlink synchronization and read of information over a broadcast channel, preferentially at the frequency with maximum power. However the frequency used by an access system is dynamically variable, and the access system at a frequency also varies dynamically, thus the frequency or frequencies in the prior information stored in the terminal may not necessarily be a frequency or frequencies available for a network accessed by the terminal, and if not, the terminal might waste considerable time on unnecessary downlink synchronization and other operations, thus prolonging a delay in cell selection and cell residence. If there is no prior information in the terminal, then the terminal may make a blind search throughout a frequency band in its supported bandwidth until an appropriate cell is detected, thus resulting in a delay in cell selection and cell residence.

In a CR system, the access system at the frequency also varies dynamically, and if the terminal scans the power at the frequencies based on the stored prior information, but the scanned frequency with maximum power might not necessarily be a frequency available for a network accessed by the terminal, then the terminal might waste considerable time on unnecessary downlink synchronization and other operations, thus prolonging a delay in cell selection and cell residence and decreasing the user experience.

In summary, when the terminal searches for a cell in the existing CR system, the frequency used by the access system is dynamically variable, so that the terminal may tend to waste considerable time on unnecessary downlink synchronization and other operations, thus prolonging a delay in cell selection and cell residence and decreasing the user experience.

SUMMARY

Embodiments of the application provide a method of and device for searching for a cell in a cognitive system so as to address the problem that when a terminal searches for a cell in an existing CR system, the frequency used by an access system is dynamically variable, so that the terminal may tend to waste considerable time on unnecessary downlink synchronization and other operations, thus prolonging a delay in cell selection and cell residence and decreasing the user experience.

An embodiment of the application provides a method of searching for a cell in a cognitive system, the method including:

determining, by a terminal, different categories of frequencies among frequencies supported by the cognitive system, wherein the frequencies of the cognitive system are categorized into a first category of authorized frequencies, a first category of unauthorized frequencies, a second category of authorized frequencies and a second category of unauthorized frequencies in an order of descending priorities; and performing, by the terminal, cell search and cell residence at the frequencies supported by the cognitive system in an order of descending priorities;

wherein the second category of authorized frequencies includes the other authorized frequencies than the first category of authorized frequencies among the authorized frequencies supported by the cognitive system, and the second category of unauthorized frequencies includes the other unauthorized frequencies than the first category of unauthorized frequencies among the unauthorized frequencies supported by the cognitive system.

An embodiment of the application provides a device for searching for a cell in a cognitive system, the device including:

a determining module configured to determine different categories of frequencies among frequencies supported by the cognitive system, wherein the frequencies in the cognitive system are categorized into a first category of authorized frequencies, a first category of unauthorized frequencies, a second category of authorized frequencies and a second category of unauthorized frequencies in an order of descending priorities; and a processing module configured to perform cell search and cell residence at the frequencies supported by the cognitive system in an order of descending priorities;

wherein the second category of authorized frequencies includes the other authorized frequencies than the first category of authorized frequencies among the authorized frequencies supported by the cognitive system; and the second category of unauthorized frequencies includes the other unauthorized frequencies than the first category of unauthorized frequencies among the unauthorized frequencies supported by the cognitive system.

In the embodiments of the application, the terminal determines different categories of frequencies among frequencies supported by the cognitive system and performs cell search and cell residence at the respective frequencies of the cognitive system in an order of descending priorities to thereby optimize the cell selection mechanism, making it possible to rapidly and accurately search for an appropriate cell to reside so as to shorten an operation delay in cell search and cell residence by the terminal after being powered on, thus improving the user experience.

DETAILED DESCRIPTION OF THE EMBODIMENTS

In embodiments of the application, a terminal determines different categories of frequencies among frequencies supported by a cognitive system and performs cell search and cell residence at the respective frequencies of the cognitive system in an order of descending priorities to thereby optimize the cell selection mechanism, making it possible to rapidly and accurately search for an appropriate cell and reside thereat.

Prior to a description of the respective embodiments of the application, firstly some technical features as referred to in the embodiments of the application may be defined below.

Frequency bands supported by a cognitive system according to the embodiments of the application include an authorized frequency band and an unauthorized frequency band. The authorized frequency band refers to a frequency band specified in a protocol or a policy, i.e., a frequency band allocated fixedly to the cognitive system; and the unauthorized frequency band refers to an idle frequency band allocated fixedly to an authorized system or a frequency band which is not specified in the protocol or the policy.

Authorized frequencies supported by the cognitive system refer to the numbers of respective fixed frequencies in the authorized frequency band, and unauthorized frequencies refer to the numbers of respective fixed frequencies in the unauthorized frequency band.

The authorized frequencies and the unauthorized frequencies supported by the cognitive system are known to the terminal During the terminal performs cell search and cell residence procedures in the cognitive system, the terminal categorizes the frequencies supported by the cognitive system, in an order of descending priorities, into a first category of authorized frequencies, a first category of unauthorized frequencies, a second category of authorized frequencies and a second category of unauthorized frequencies. The second category of authorized frequencies includes the other authorized frequencies than the first category of authorized frequencies among the authorized frequencies supported by the cognitive system; and the second category of unauthorized frequencies includes the other unauthorized frequencies than the first category of unauthorized frequencies among the unauthorized frequencies supported by the cognitive system.

The embodiments of the application may be described below in further details with reference to the drawings.

Figure 1:
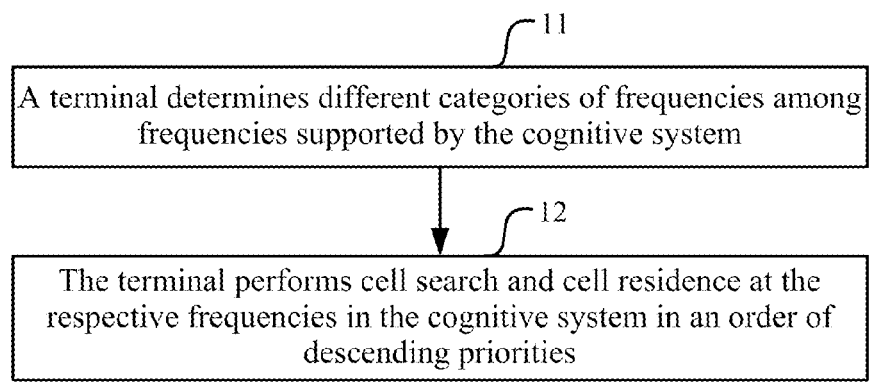
FIG. 1 is a flow chart of a method of searching for a cell in a cognitive system according to an embodiment of the application.

Referring to FIG. 1, a method of searching for a cell in a cognitive system according to an embodiment of the application includes the following operations:

In an operation 11, a terminal determines different categories of frequencies among frequencies supported by the cognitive system; and In an operation 12, the terminal performs cell search and cell residence at the frequencies supported by the cognitive system in an order of descending priorities.

Furthermore in the operation 11, the terminal determines a first category of authorized frequencies and a first category of unauthorized frequencies among the frequencies supported by the cognitive system in one or combination of the following schemes:

Scheme A, the terminal determines the first category of authorized frequencies and the first category of unauthorized frequencies according to frequency information in prior information stored in the terminal;

Scheme B, the terminal determines the first category of authorized frequencies and the first category of unauthorized frequencies according to frequency information, about authorized frequencies and/or unauthorized frequencies currently used by a cell where the terminal is located, stored in a database. The frequency information includes but may not be limited to the following respective pieces of information: the categories of the frequencies (e.g., authorized frequencies, unauthorized frequencies, etc.), periods of validity of the frequencies, the IDs of cells at the frequencies, corresponding spare frequencies, possible alternative radio access technologies at operating frequencies, etc., and a particular format of the frequency information can be as depicted in Table 1 in which only the frequency information about the frequency f1 is depicted.

TABLE 1

| Number of operating frequency | The category of frequency | Period of validity of operating frequency | ID of cell | Number of spare frequency | Possible alternative radio access technology at operating frequency | Note |
| --- | --- | --- | --- | --- | --- | --- |
| f1 | Unauthorized frequency | 24:00 on Jan. 31, 2012 to 24:00 on Mar. 31, 2012 | **** | f3 | GSM | |

It shall be noted that the terminal can determine the first category of authorized frequencies and the first category of unauthorized frequencies in the different schemes under a real condition;

For example, if there is prior information in the terminal, then the terminal determines the first category of authorized frequencies and the first category of unauthorized frequencies preferentially in the scheme A. In another example, if there is no prior information in the terminal, then the terminal determines the first category of authorized frequencies and the first category of unauthorized frequencies preferentially in the scheme B. In still another example, if the terminal was positioned before being powered off geographically at a different location from that of the terminal powered on currently (for example, the terminal was positioned at Shanghai before being powered off while the terminal is positioned at Beijing upon being powered on), then the terminal determines the first category of authorized frequencies and the first category of unauthorized frequencies preferentially in the scheme B regardless of whether there is prior information in the terminal.

The scheme A can be further implemented in the following three modes:

In a mode A1, if there is prior information in the terminal and the prior information includes the frequency information about the authorized frequencies, then the terminal determines the first category of authorized frequencies and the first category of unauthorized frequencies among the frequencies supported by the cognitive system in the following operations:

The terminal determines all the authorized frequencies in the prior information as the first category of authorized frequencies;

The terminal is synchronized to a common control channel of a cell at the first category of authorized frequencies and obtains frequency information corresponding to adjacent cells, the common channel can be a broadcast channel or another common channel over which frequency information about cells can be transmitted, and the common control channel can be specified in a protocol or agreed on between two parties; and The terminal determines the first category of unauthorized frequencies according to information about periods of validity of the unauthorized frequencies in the obtained frequency information.

It shall be noted that the mode A1 is particularly applicable to a scenario where the prior information includes only the frequency information about the authorized frequencies although the mode A1 may be applicable as well to a scenario where the prior information includes the frequency information about the authorized frequencies and frequency information about the unauthorized frequencies.

Furthermore if the prior information includes only one authorized frequency, then the authorized frequency is determined as the first category of authorized frequency, and the terminal attempts on synchronization to a common control channel of a cell at the first category of authorized frequency to obtain parameter information required for making residence judgment corresponding to the cell, and frequency information about adjacent cells, etc.;

Furthermore if there are a plurality of cells at the first category of authorized frequencies, then the terminal firstly attempts on synchronization to a common control channel of the cell with the highest signal strength, and if the terminal is synchronized successfully, then the terminal obtains parameter information corresponding to the cell and frequency information about adjacent cells (including unauthorized frequencies of the adjacent cells and their corresponding spare frequencies) over the common control channel; and if the terminal is synchronized unsuccessfully, then the terminal attempts on synchronization to a common control channel of the cell at the next highest signal strength, and so on, and if the terminal is synchronized unsuccessfully at all the first category of authorized frequencies, then the terminal determines the first category of authorized frequencies and the first category of unauthorized frequencies in the scheme B.

Furthermore if the prior information includes a plurality of authorized frequencies, then all the plurality of authorized frequencies are determined as the first category of authorized frequencies, and firstly the terminal attempts on synchronization to a common control channel of a cell at the first category of authorized frequency with the optimum channel quality to obtain parameter information required for making residence judgment corresponding to the cell, and frequency information about adjacent cells, etc.;

Furthermore if there are a plurality of cells at each of the first category of authorized frequencies, then the terminal firstly attempts on synchronization to a common control channel of the cell with the highest signal strength, and if the terminal is synchronized successfully, then the terminal obtains parameter information corresponding to the cell and frequency information about adjacent cells (including unauthorized frequencies of the adjacent cells and their corresponding spare frequencies) over the common control channel; and if the terminal is synchronized unsuccessfully, then the terminal attempts on synchronization to a common control channel of the cell at the next highest signal strength, and so on.

Furthermore if the terminal is synchronized unsuccessfully at all the first category of authorized frequencies with the optimum channel quality, then the terminal attempts on synchronization to a common control channel of a cell at the first category of authorized frequency with the next optimum channel quality, and so on; and if the terminal is synchronized unsuccessfully at all the first category of authorized frequencies, then the terminal determines the first category of authorized frequencies and the first category of unauthorized frequencies in the scheme B.

Furthermore the terminal determines the first category of unauthorized frequencies according to the information about the periods of validity of the unauthorized frequencies in the obtained frequency information as follows:

The terminal determines unauthorized frequencies with the periods of validity that do not expire in the obtained frequency information as the first category of unauthorized frequencies;

The terminal determines spare frequencies corresponding to unauthorized frequencies with the periods of validity that expire in the obtained frequency information as the first category of unauthorized frequencies; and The terminal determines unauthorized frequencies for which no information about the periods of validity is available and their corresponding spare frequencies as the first category of unauthorized frequencies.

In a mode A2, if there is prior information in the terminal and the prior information includes only the frequency information about the unauthorized frequencies, then the terminal determines the first category of authorized frequencies and the first category of unauthorized frequencies among the frequencies supported by the cognitive system as follows:

The terminal determines that there is no first category of unauthorized frequencies among the frequencies supported by the cognitive system; and The terminal determines the first category of unauthorized frequencies according to the information about the periods of validity of the unauthorized frequencies, which is included in the frequency information in the prior information, particularly as described with respect to the mode A1.

In a mode A3, if there is prior information in the terminal and the prior information includes the frequency information about the authorized frequencies and the frequency information about the unauthorized frequencies, then the terminal determines the first category of authorized frequencies and the first category of unauthorized frequencies among the frequencies supported by the cognitive system as follows:

The terminal determines all the authorized frequencies in the prior information as the first category of authorized frequencies; and The terminal determines the first category of unauthorized frequencies according to the information about the periods of validity of the unauthorized frequencies, which is included in the frequency information in the prior information, particularly as described with respect to the mode A1.

For the scheme B, the terminal determines the first category of authorized frequencies and the first category of unauthorized frequencies among the frequencies supported by the cognitive system in the scheme B as follows:

The terminal sets up a connection with a system serving the database by a preset channel. The preset channel by which the terminal is connected with the system serving the database can be specified in the protocol or the policy to ensure that there is a fixed frequency band in some area to support this access function;

The terminal transmits an access request to the system serving the database to inquire about the authorized frequencies and the unauthorized frequencies, the access request includes attribute information about the terminal and a frequency information obtainment request; and The terminal determines the first category of authorized frequencies and the first category of unauthorized frequencies according to the received frequency information.

Particularly the terminal can transmit the access request to the system serving the database to inquire about the authorized frequencies and the unauthorized frequencies by transmitting an access request to the system serving the database to inquire about the authorized frequencies and the unauthorized frequencies currently used by the cell where the terminal is located.

Furthermore the database can be created and maintained by the authorized system or can be created and maintained by the cognitive system itself or can be created and maintained by a third party.

The database can have bandwidth information, the IDs of cells, information about synchronization sequences of synchronization channels, etc., available in addition to the frequency information, and the frequency information is requisitely available in the database.

Furthermore the terminal determines the first category of authorized frequencies and the first category of unauthorized frequencies among the frequencies according to the frequency information available from the database as follows:

The terminal determines all the authorized frequencies in the frequency information as the first category of authorized frequencies; and The terminal determines the first category of unauthorized frequencies according to the information about the periods of validity of the unauthorized frequencies, which included in the frequency information in the prior information, particularly as described with respect to the mode A1.

It shall be pointed out that the terminal determines the first category of authorized frequencies and the first category of unauthorized frequencies among the frequencies according to the frequency information available from the database as above on the precondition that the frequency information available from the database includes both the frequency information about the authorized frequencies and the frequency information the about unauthorized frequencies. If the frequency information available from the database is only the frequency information about the authorized frequencies or the frequency information about unauthorized frequencies, then they can be determined as described with respect to the mode A1.

After the terminal determines the first category of authorized frequencies and the first category of unauthorized frequencies, the flow proceeds as follows:

The terminal determines the other authorized frequencies than the first category of authorized frequencies among the authorized frequencies supported by the cognitive system as the second category of authorized frequencies; and The terminal determines the other unauthorized frequencies than the first category of unauthorized frequencies among the unauthorized frequencies supported by the cognitive system as the second category of unauthorized frequencies.

It shall be noted that if the terminal fails to determine the first category of authorized frequencies in both the scheme A and the scheme B, then the terminal determines that there is no first category of authorized frequencies among the frequencies supported by the cognitive system and determines all the authorized frequencies among the frequencies supported by the cognitive system as the second category of authorized frequencies; and If the terminal fails to determine the first category of unauthorized frequencies in both the scheme A and the scheme B, then the terminal determines that there is no first category of unauthorized frequencies among the frequencies supported by the cognitive system and determines all the unauthorized among the frequencies supported by the cognitive system as the second category of unauthorized frequencies.

Furthermore in the operation 12, the terminal performs cell search and cell residence at the respective frequencies supported by the cognitive system in an order of descending priorities as follows:

The terminal performs cell search and cell residence at the first category of authorized frequencies of the cognitive system, and the terminal resides at an appropriate cell upon detection of such a cell;

If no appropriate cell to reside is detected throughout the first category of authorized frequencies, then the terminal performs cell search and cell residence at the first category of unauthorized frequencies of the cognitive system, and the terminal resides at an appropriate cell upon detection of such a cell;

If no appropriate cell to reside is detected throughout the first category of unauthorized frequencies, then the terminal performs cell search and cell residence at the second category of authorized frequencies of the cognitive system, and the terminal resides at an appropriate cell upon detection of such a cell;

If no appropriate cell to reside is detected throughout the second category of authorized frequencies, then the terminal performs cell search and cell residence at the second category of unauthorized frequencies of the cognitive system, and the terminal resides at an appropriate cell upon detection of such a cell; and If no appropriate cell to reside is detected throughout the second category of unauthorized frequencies, then the terminal stops searching for the cell and repeats the operations above after a preset length of time, that is, the terminal performs cell search and cell residence again at the respective frequencies of the cognitive system in an order of descending priorities.

Furthermore if the terminal supports a plurality of radio access schemes, then the terminal can attempt to access the cognitive system in another radio access scheme, particularly as in the flow above.

Furthermore if there are a plurality of the first category of authorized frequencies determined, then the terminal performs cell search and cell residence at the first category of authorized frequencies as follows: the terminal performs cell search at the respective first category of authorized frequencies in an order of descending of channel qualities;

If there are a plurality of the first category of unauthorized frequencies determined, then the terminal performs cell search and cell residence at the first category of unauthorized frequencies as follows: the terminal performs cell search and cell residence at the respective first category of unauthorized frequencies in an order of descending of channel qualities;

If there are a plurality of the second category of authorized frequencies determined, then the terminal performs cell search and cell residence at the second category of authorized frequencies as follows: the terminal performs cell search and cell residence at the respective first second of authorized frequencies in an order of descending of channel qualities; and If there are a plurality of the second category of unauthorized frequencies determined, then the terminal performs cell search and cell residence at the second category of unauthorized frequencies as follows: the terminal performs cell search and cell residence at the respective second category of unauthorized frequencies in an order of descending of channel qualities.

Furthermore the terminal performs the cell search at some frequency in the following procedure:

The Non Access Stratum (NAS) activates the Radio Resource Control (RRC) layer to start a cell selection procedure;

The RRC layer instructs the Physical (PHY) layer to measure Reference Signal Received Power (RSRP) and also activates the Medium Access Control (MAC) layer to transition from the NULL state to the cell selection state;

The PHY layer reports measured values of the RSRP and corresponding cell information to the RRC layer;

The RRC layer sorts the cells according to the measured values of the RSRP and requests the PHY layer for synchronization to the cell with the highest measured value of the RSRP (i.e., the cell with the strongest signal);

If the PHY layer is synchronized successfully to the cell with the strongest signal, then the PHY layer receives broadcast information over a broadcast channel of the cell and reports the broadcast information to the RRC layer;

The RRC layer judges from the contents of the broadcast information and the measured value of the RSRP of the cell whether the cell is a Public Land Mobile Network (PLMN) cell specified in the NAS; and if so, then the RRC layer makes judgment against the S criterion (i.e., judgment against a condition to reside);

If the cell satisfies the condition to reside (i.e., S>0), then the terminal resides at the cell and enters the IDLE state; and If the cell does not satisfy the condition to reside, then the terminal is instructed to be synchronized to the cell with the next strongest signal.

Furthermore the terminal makes judgment against the condition to reside at a cell in Equation 1 of:

$$S_{rxlex} = Q_{rxlevmeas} - (Q_{rxlevmin} + Q_{rxlevmin\ offset}) - P_{compensation} \qquad \text{Equation 1;}$$

Where $S_{rxlex}$ represents the value S of cell selection, $Q_{rxlevmeas}$ represents the value of received reference signal power, $Q_{rxlevmin}$ represents the lowest power of a received signal, $Q_{rxlevmin\ offset}$ represents the offset of $Q_{rxlevmin}$ when a PLMN with a high priority is selected periodically when the terminal resides in a VPLMN, and $P_{compensation}$=max (PEMAX−PUMAX,0) with PEMAX representing the highest transmit power of the terminal in uplink transmission and PUMAX representing the highest radio frequency output power of the terminal; and the S criterion complies with the criterion in the existing TD-LTE, and information about the respective parameters in Equation 1 is included in the information provided by the broadcast channel;

If $S_{rxlex}$>0, then the cell satisfies the condition to reside; and

If $S_{rxlex}$≤0, then the cell does not satisfy the condition to reside.

Implementations of the method according to the embodiment of the application in particular application scenarios may be described below in details in three particular application embodiments.

First Embodiment:

In the mode A1 above, it is assumed that there is such a procedure in a CR system that a TD-LTE enabled terminal performs cell search and cell residence upon being powered on. The respective unauthorized frequencies of the CR system include f1, f2, f3, f4 and f5 and authorized frequencies thereof include f6, f7 and f8, and the terminal works in a TD-LTE cell at the carrier frequency f6 in the CR system before being powered off, where frequency information about the frequency f6 is stored in the terminal.

Figure 2:
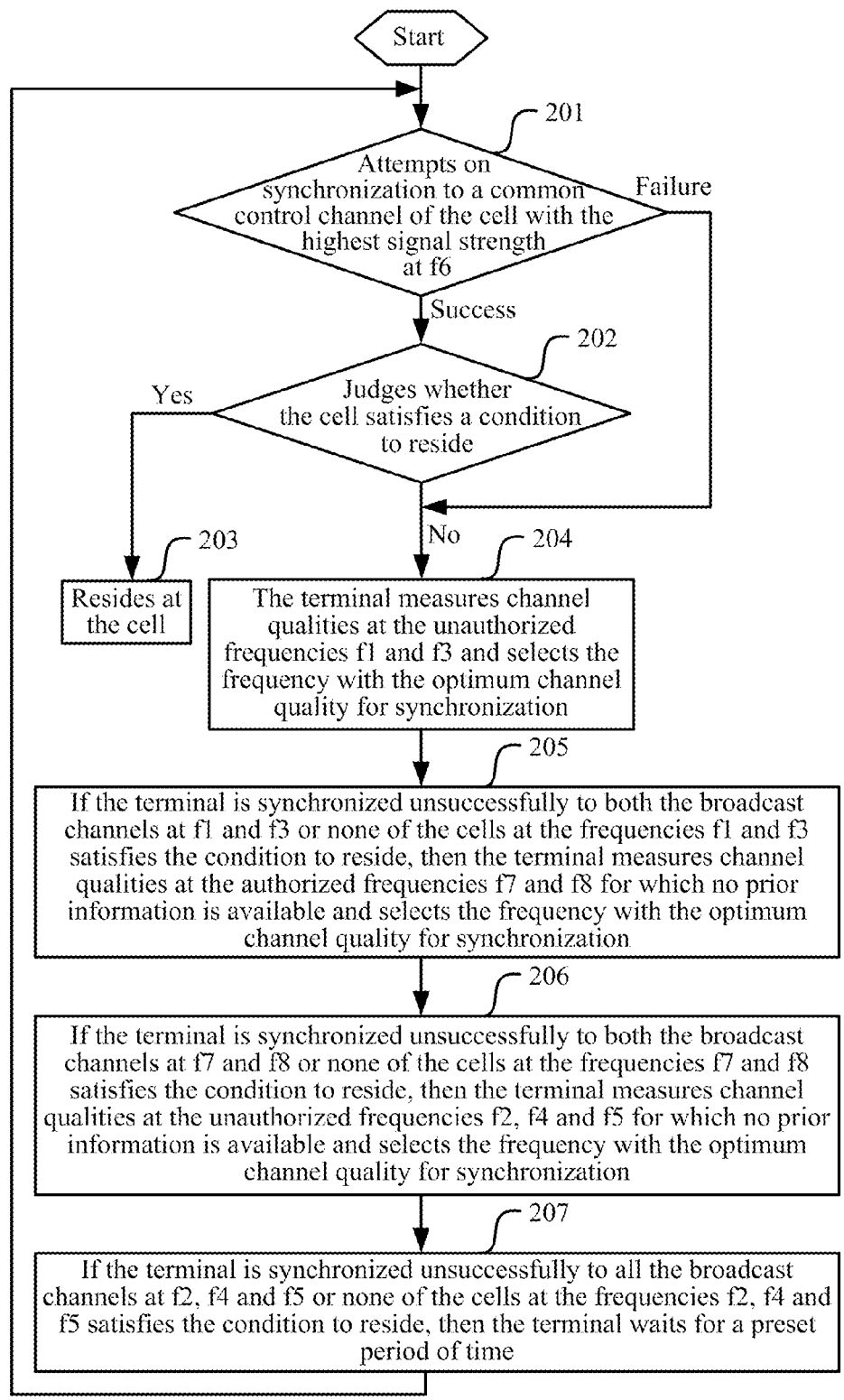
FIG. 2 is a flow chart of a first method of searching for a cell in a cognitive system according to an embodiment of the application.

Referring to FIG. 2, the procedure of performing cell search and cell residence by the terminal includes the following operations:

In an operation 201, the terminal measures the values of signal strengths of respective cells corresponding to f6 and attempts on synchronization to a common control channel (which is a broadcast channel described in this embodiment by way of an example) of the cell with the highest value of signal strength;

If the terminal is synchronized successfully, then the terminal reads information over the broadcast channel so as to obtain parameter information required for making the cell residence judgment, unauthorized frequencies of the cell and its adjacent cells, and the flow proceeds to an operation 202, the obtained unauthorized frequencies of the adjacent cells are f1 and f3; and If the terminal is synchronized unsuccessfully, then the terminal proceeds to an operation 204.

In the operation 202, the terminal judges whether the cell satisfies a condition to reside by the S value of cell selection (i.e., the value of $S_{rxlex}$) derived from the obtained parameter information of the cell at the frequency f6 in the S criterion (i.e., Equation 1);

If so, that is, $S_{rxlex}>0$, then the flow proceeds to an operation 203; and

If not, that is, $S_{rxlex}\leq0$, then the flow proceeds to the operation 204'

In the operation 203, the terminal resides at the cell;

In the operation 204, the terminal measures channel qualities at the unauthorized frequencies f1 and f3 and selects the frequency with the optimum channel quality for synchronization;

For example, if the channel quality at f1 is higher than the channel quality at f3, then the terminal firstly attempts on synchronization to a broadcast channel at f1, and if the terminal is synchronized successfully, then the terminal obtains parameter information, which is required for making cell residence judgment, over the broadcast channel at f1 and judges whether a cell at the frequency f1 satisfies the condition to reside in Equation 1 in a process similar to the process in the operation 202 in which it is judged whether the cell at the frequency f6 satisfies the condition to reside, so a repeated description thereof may be omitted here;

If so, then the terminal resides at the cell;

If not, then the terminal attempts on synchronization to a broadcast channel at f3 in a process similar to the process in which the terminal is synchronized to the broadcast channel at f1, so a repeated description thereof may be omitted here; and If the terminal is synchronized unsuccessfully, then the terminal attempts on synchronization to a broadcast channel at f3 in the same process above.

In an operation 205, if the terminal is synchronized unsuccessfully to both the broadcast channel at f1 and the broadcast channel at f3 or none of the cells at the frequencies f1 and f3 satisfies the condition to reside, then the terminal measures channel qualities at the authorized frequencies f7 and f8 for which no prior information is available and selects the frequency with the optimum channel quality for synchronization.

For example, if the channel quality at f7 is higher than the channel quality at f8, then the terminal firstly attempts on synchronization to a broadcast channel at f7, and if the terminal is synchronized successfully, then the terminal obtains parameter information required for making cell residence judgment and judges whether the condition to reside is satisfied; and if so, then the terminal resides at a cell at the frequency f7.

If the terminal is synchronized unsuccessfully or the condition to reside is not satisfied, then the terminal attempts on synchronization to a broadcast channel at f8 and proceeds to the same judgment flow, and once the condition to reside is satisfied, the terminal resides at a cell at the frequency f8.

In an operation 206, if the terminal is synchronized unsuccessfully to both the broadcast channel at f7 and the broadcast channel at f8 or none of the cells at the frequencies f7 and f8 satisfies the condition to reside, then the terminal measures channel qualities at the unauthorized frequencies f2, f4 and f5 for which no prior information is available and selects the frequency with the optimum channel quality for synchronization.

For example, if the channel quality at f2 is higher than the channel quality at f4 and the channel quality at f4 is higher than the channel quality at f5, then the terminal firstly attempts on synchronization to a broadcast channel at f2, and if the terminal is synchronized successfully, then the terminal obtains parameter information required for making cell residence judgment and judges whether the condition to reside is satisfied; and if the condition to reside is satisfied, then the terminal resides at a cell at the frequency f2.

If the terminal is synchronized unsuccessfully or the condition to reside is not satisfied, then the terminal attempts on synchronization to a broadcast channel at f4 and proceeds to the same judgment flow, and once the condition to reside is satisfied, the terminal resides at a cell at the frequency f4.

If the terminal is synchronized unsuccessfully or the condition to reside is not satisfied, then the terminal attempts on synchronization to a broadcast channel at f5 and proceeds to the same judgment flow, and once the condition to reside is satisfied, the terminal resides at a cell at the frequency f5.

In an operation 207, if the terminal is synchronized unsuccessfully to all the broadcast channels at f2, f4 and f5 or none of the cells at the frequencies f2, f4 and f5 satisfies the condition to reside, that is, the terminal fails to locate an appropriate cell to reside at, then the terminal restarts the operation 201 to the operation 206 after waiting for a preset period of time.

It shall be noted that in the operation 207, if the terminal supports a plurality of radio access schemes concurrently, then the terminal attempts on an access in another radio access scheme, a particular flow of which is similar to the operation 201 to the operation 206 above, so a repeated description thereof may be omitted here.

Second Embodiment:

In the scheme B above, it is assumed that there is such a procedure in a CR system that a TD-LTE enabled terminal performs cell search and cell residence upon being powered on. The respective unauthorized frequencies of the CR system include f1, f2, f3, f4 and f5 and authorized frequencies thereof include f6, f7 and f8, and the terminal works in a TD-LTE cell at the carrier frequency f6 in the CR system before being powered off. The frequency information about the frequency f6 is stored in the terminal, and a specified channel over which a database is accessed is carried over a carrier f9.

Figure 3:
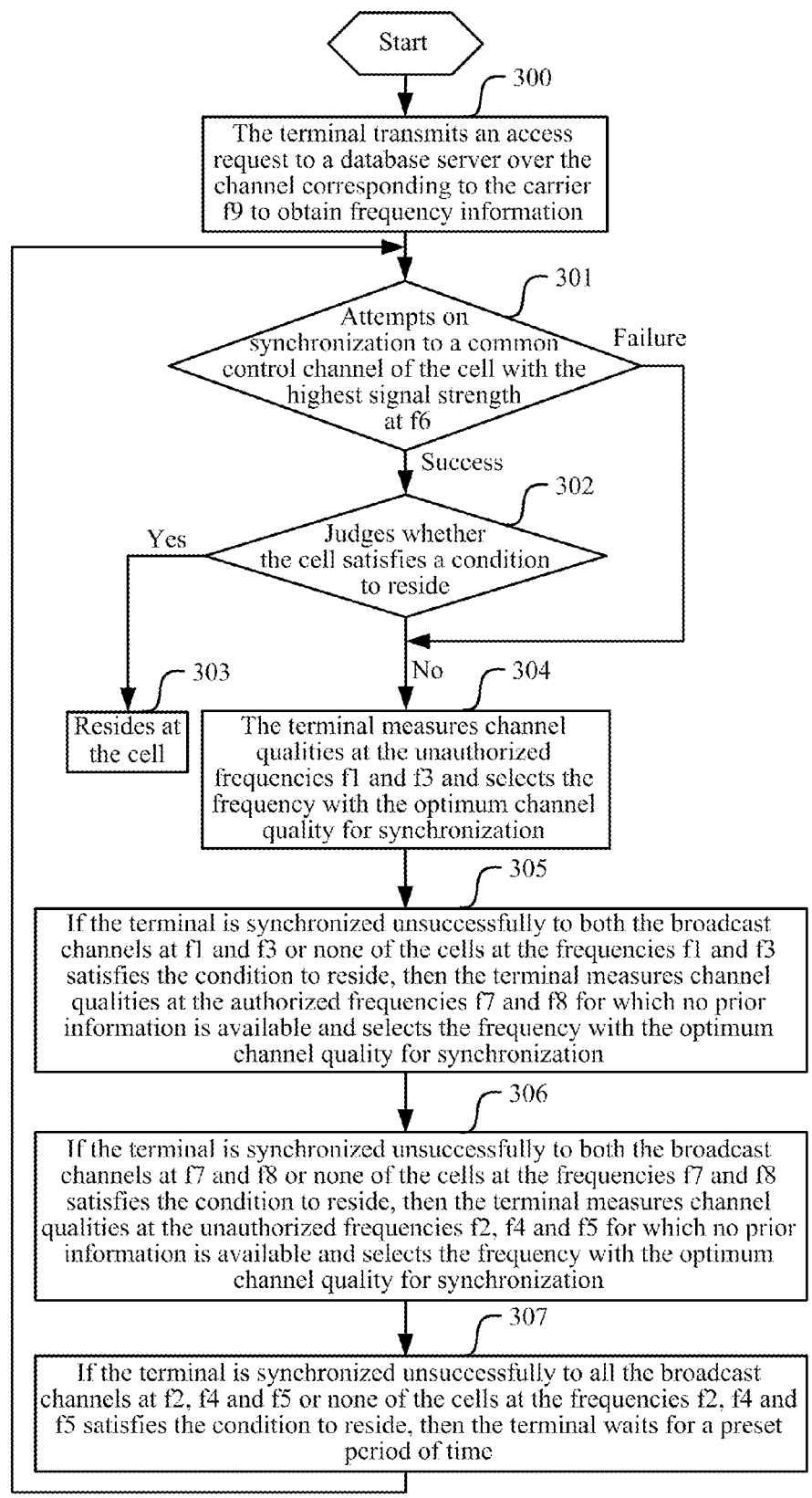
FIG. 3 is a flow chart of a second method of searching for a cell in a cognitive system according to an embodiment of the application.

Referring to FIG. 3, the procedure of performing cell search and cell residence by the terminal includes the following operations:

In an operation 300, the terminal transmits an access request to a database server over the channel corresponding to the carrier f9 to obtain frequency information;

The access request includes information about the terminal itself and an request to obtain the use of the unauthorized frequencies in an area where the terminal is located and adjacent cells, and the information about the terminal itself includes the geographical location of the terminal, a radio access scheme or schemes supported by the terminal, an RF capability of the terminal, etc.;

In response to the access request of the terminal, the database server notifies the terminal of the authorized frequency f6 and the unauthorized frequencies f1 and f3 in the area where the terminal is located, the radio access technology TD-LTE available at the respective frequencies and other information about the respective frequencies, such as the IDs of cells, synchronization information, etc., corresponding to the frequencies;

In an operation 301, the terminal measures the values of signal strengths of the respective cells corresponding to f6 and attempts on synchronization to a common control channel (which is a broadcast channel described in this embodiment by way of an example) of the cell with the highest value of signal strength.

If the terminal is synchronized successfully, then the terminal reads information over the broadcast channel to obtain parameter information required for making the cell residence judgment and proceeds to an operation 302; and If the terminal is synchronized unsuccessfully, then the terminal proceeds to an operation 304.

The operation 302 to the operation 307 are the same as the operation 202 to the operation 207, so a repeated description thereof may be omitted here.

Third Embodiment:

In the mode A3 above, it is assumed that there is such a procedure in a CR system that a TD-LTE enabled terminal performs cell search and cell residence upon being powered on. The respective unauthorized frequencies of the CR system include f1, f2, f3, f4 and f5 and authorized frequencies thereof include f6, f7 and f8, and the terminal works in a TD-LTE cell at the carrier frequency f6 in the CR system before being powered off. The terminal has obtained frequency information about the authorized frequencies and frequency information about the unauthorized frequencies over a broadcast channel or by measuring power and stored them when operating previously.

Figure 4:
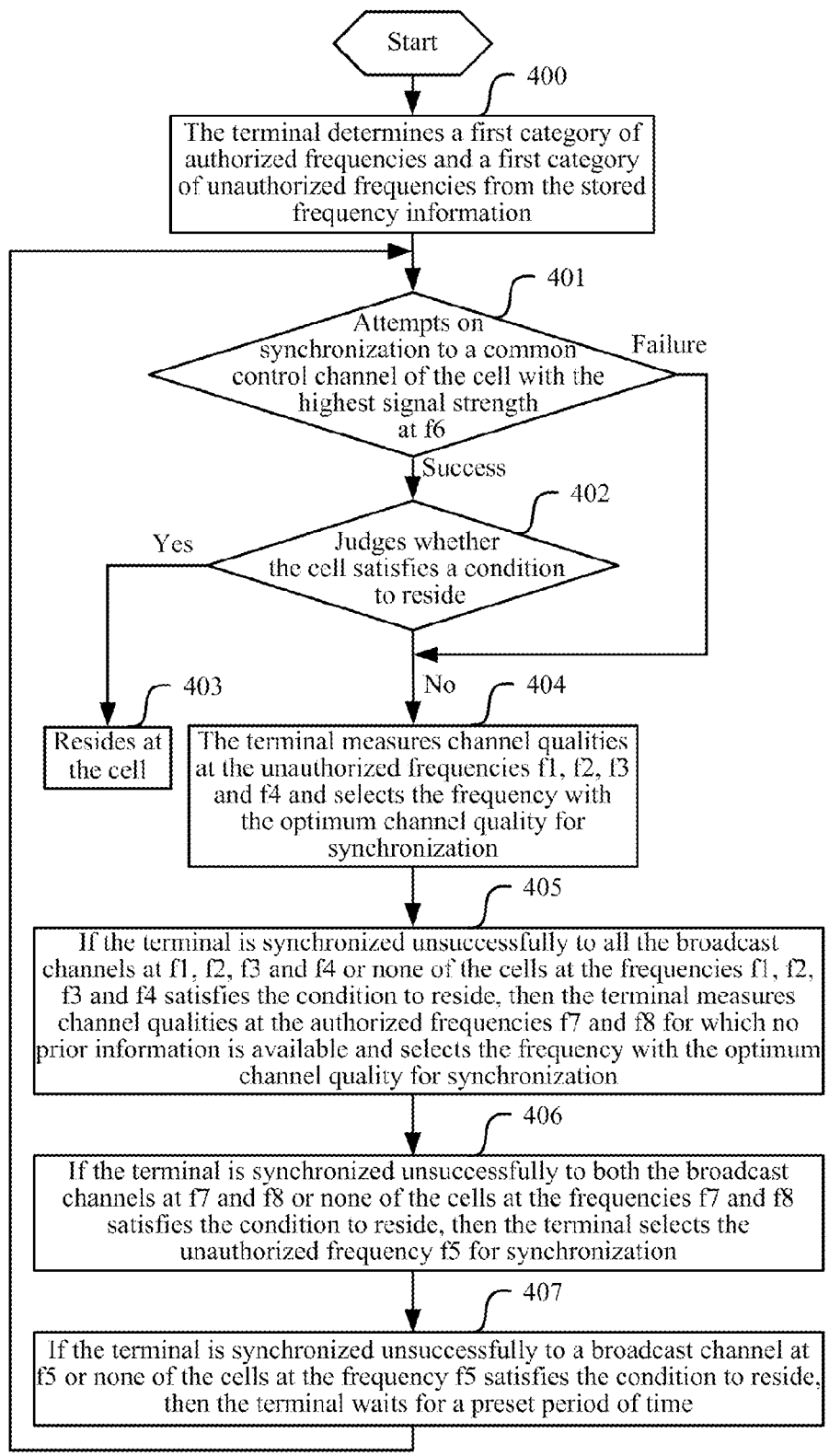
FIG. 4 is a flow chart of a third method of searching for a cell in a cognitive system according to an embodiment of the application.

Referring to FIG. 4, the procedure of performing cell search and cell residence by the terminal includes the following operations:

In an operation 400, the terminal determines a first category of authorized frequencies and a first category of unauthorized frequencies according to the stored frequency information.

It is assumed that the frequency information stored in the terminal is as depicted in Table 2, and as can be apparent, the first category of authorized frequency is f6; and for the unauthorized frequency f5, the period of validity of f5 has expired, so the spare frequency f1 corresponding to f5 is determined as the first category of unauthorized frequency; for the unauthorized frequency f3, the period of validity of f3 has not expired, so f3 is also determined as the first category of unauthorized frequency; and for the unauthorized frequency f2, information about its period of validity is not available, so it can not be judged whether f2 expires, and thus f2 and its corresponding spare frequency f4 are also determined as the first category of unauthorized frequencies;

TABLE 2

| Number of operating frequency | The category of frequency | Period of validity of operating frequency | ID of cell | Number of spare frequency | Possible alternative radio access technology at operating frequency | Note |
|---|---|---|---|---|---|---|
| f5 | Unauthorized frequency | 24:00 on Jan. 31, 2012 to 24:00 on Mar. 31, 2012 | **** | f1 | GSM | |
| f3 | Unauthorized frequency | 24:00 on Jan. 31, 2012 to 24:00 on May 31, 2012 | *** | f2 | TD-SCDMA | |
| f2 | Unauthorized frequency | NULL | *** | f4 | | |
| f6 | Authorized frequency | Always active by default | *** | N/A | N/A | |

Where NULL represent a null value.

In an operation 401, the terminal measures the values of signal strengths of respective cells corresponding to f6 and attempts on synchronization to a common control channel (which is a broadcast channel described in this embodiment by way of an example) of the cell with the highest value of signal strength.

If the terminal is synchronized successfully, then the terminal reads information over the broadcast channel to obtain parameter information required for making the cell residence judgment and proceeds to an operation 402; and If the terminal is synchronized unsuccessfully, then the terminal proceeds to an operation 404.

The operation 402 to the operation 407 are similar as the operation 202 to the operation 207, so a repeated description thereof may be omitted here.

Based upon the same inventive idea, an embodiment of the application further provides a device for searching for a cell in a cognitive system, and since the device addresses the problem under a similar principle to the method above of searching for a cell in a cognitive system, reference can be made to the implementation of the method for an implementation of the device, so a repeated description thereof may be omitted here.

Figure 5:
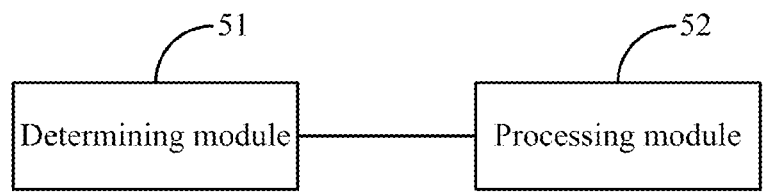
FIG. 5 is a schematic structural diagram of a device for searching for a cell in a cognitive system according to an embodiment of the application.

Referring to FIG. 5, a device for searching for a cell in a cognitive system according to an embodiment of the application includes:

A determining module 51 is configured to determine different categories of frequencies among frequencies supported by the cognitive system, where the frequencies in the cognitive system are categorized into a first category of authorized frequencies, a first category of unauthorized frequencies, a second category of authorized frequencies and a second category of unauthorized frequencies in an order of descending priorities; and A processing module 52 is configured to perform cell search and cell residence at the frequencies supported by the cognitive system in an order of descending priorities.

The second category of authorized frequencies includes the other authorized frequencies than the first category of authorized frequencies among the authorized frequencies supported by the cognitive system; and the second category of unauthorized frequencies includes the other unauthorized frequencies than the first category of unauthorized frequencies among the unauthorized frequencies supported by the cognitive system.

Preferably the determining module 51 is particularly configured:

To determine the first category of authorized frequencies and the first category of unauthorized frequencies among the frequencies by the cognitive system;

To determine the other authorized frequencies than the first category of authorized frequencies among the authorized frequencies by the cognitive system as the second category of authorized frequencies; and To determine the other unauthorized frequencies than the first category of unauthorized frequencies among the unauthorized frequencies by the cognitive system as the second category of unauthorized frequencies.

Based upon any of the embodiments at the device side, preferably the determining module 51 is particularly configured:

To determine the first category of authorized frequencies and the first category of unauthorized frequencies according to frequency information in prior information stored in the device (the scheme A); and/or To determine the first category of authorized frequencies and the first category of unauthorized frequencies according to frequency information, about authorized frequencies and/or unauthorized frequencies currently used by a cell where the device is located, stored in a database (the scheme B).

For the scheme A, preferably the determining module 51 can be particularly configured:

If there is prior information in the device and the prior information includes the frequency information about the authorized frequencies, to determine all the authorized frequencies in the prior information as the first category of authorized frequencies; to synchronize the device to a common control channel of a cell at the first category of authorized frequencies and to obtain frequency information corresponding to adjacent cells; and to determine the first category of unauthorized frequencies according to information about periods of validity of the unauthorized frequencies in the obtained frequency information.

For the scheme A, preferably the determining module 51 can be further configured:

If there is prior information in the device and the prior information includes only the frequency information about the unauthorized frequencies, to determine that there is no the first category of unauthorized frequencies among the frequencies supported by the cognitive system; and to determine the first category of unauthorized frequencies according to information about periods of validity of the unauthorized frequencies in the frequency information.

For the scheme A, preferably the determining module 51 can be further configured:

If there is prior information in the device and the prior information includes the frequency information about the authorized frequencies and the frequency information about the unauthorized frequencies, to determine all the authorized frequencies in the prior information as the first category of authorized frequencies; and to determine the first category of unauthorized frequencies according to information about periods of validity of the unauthorized frequencies in the frequency information.

For the first preferred implementation above of the scheme A above, preferably the determining module 51 is configured:

If there are a plurality of cells at the first category of authorized frequencies, to synchronization to common control channels of the respective cells in an order of descending signal strengths.

For the scheme B above, preferably the determining module 51 is configured:

To set up a connection with a system serving the database by a preset channel; to transmit an access request to the system serving the database to inquire about the authorized frequencies and the unauthorized frequencies; and to determine the first category of authorized frequencies and the first category of unauthorized frequencies according to the received frequency information.

The access request includes attribute information about the device and a frequency information obtainment request.

For the scheme B above, preferably the determining module 51 is configured:

To set up a connection with a system serving the database by a preset channel; to transmit an access request to the system serving the database to inquire about the authorized frequencies and/or the unauthorized frequencies currently used by the cell where the device is located; and to determine the first category of authorized frequencies and the first category of unauthorized frequencies according to the received frequency information.

The access request includes attribute information about the device and a frequency information obtainment request.

For the preferred implementations above of the scheme B above, preferably the determining module 51 is configured:

To determine the authorized frequencies in the frequency information as the first category of authorized frequencies and to determine the first category of unauthorized frequencies according to information about periods of validity of the unauthorized frequencies in the frequency information.

Based upon any of the embodiments at the device side, preferably the determining module 51 is configured:

To determine unauthorized frequencies with the periods of validity that do not expire in the frequency information as the first category of unauthorized frequencies; to determine spare frequencies corresponding to unauthorized frequencies with the periods of validity that expire in the frequency information as the first category of unauthorized frequencies; and to determine unauthorized frequencies for which no information about the periods of validity is available and their corresponding spare frequencies as the first category of unauthorized frequencies.

Based upon any of the embodiments at the device side, preferably the processing module 52 is configured:

If there are a plurality of the first category of authorized frequencies determined, to perform cell search and cell residence at the respective first category of authorized frequencies in an order of descending of channel qualities;

If there are a plurality of the first category of unauthorized frequencies determined, to perform cell search and cell residence at the respective first category of unauthorized frequencies in an order of descending of channel qualities;

If there are a plurality of the second category of authorized frequencies determined, to perform cell search and cell residence at the respective second category of authorized frequencies in an order of descending of channel qualities; and If there are a plurality of the second category of unauthorized frequencies determined, to perform cell search and cell residence at the respective second category of unauthorized frequencies in an order of descending of channel qualities.

Based upon any of the embodiments at the device side, preferably the processing module 52 is configured:

After failing to reside at a cell at the first category of authorized frequencies, the first category of unauthorized frequencies, the second category of authorized frequencies and the second category of unauthorized frequencies, to stop searching for a cell; and to perform cell search and cell residence again at the respective frequencies in the cognitive system in an order of descending priorities after a preset length of time.

The device for searching for a cell in a cognitive system according to the embodiment of the application can be but may not be limited to the terminal in the embodiments above of the method.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the application have been described, those skilled in the art benefiting from the underlying inventive concept can make additional modifications and variations to these embodiments. Therefore the appended claims are intended to be construed as encompassing the preferred embodiments and all the modifications and variations coming into the scope of the application.

In the embodiments of the application, the terminal determines a first category of authorized frequencies and a first category of unauthorized frequencies among frequencies supported by the cognitive system, and performs cell search and cell residence at the respective frequencies of the cognitive system in an order of descending priorities to thereby optimize the cell selection mechanism, making it possible to rapidly and accurately search for an appropriate cell to reside so as to shorten an operation delay in cell search and cell residence by the terminal after being powered on, thus improving the user experience.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method of searching for a cell in a cognitive system, wherein the method comprises:

determining, by a terminal, different categories of frequencies among frequencies supported by the cognitive system, wherein frequencies of the cognitive system are categorized into a first category of authorized frequencies, a first category of unauthorized frequencies, a second category of authorized frequencies and a second category of unauthorized frequencies in an order of descending priorities; and performing, by the terminal, cell search and cell residence at the frequencies supported by the cognitive system in an order of descending priorities;

wherein the second category of authorized frequencies comprises other authorized frequencies than the first category of authorized frequencies among the authorized frequencies supported by the cognitive system, and the second category of unauthorized frequencies comprises other unauthorized frequencies than the first category of unauthorized frequencies among the unauthorized frequencies supported by the cognitive system;

wherein determining, by the terminal, the first category of authorized frequencies and the first category of unauthorized frequencies among the frequencies supported by the cognitive system comprises:

determining, by the terminal, the first category of authorized frequencies and the first category of unauthorized frequencies according to frequency information in prior information stored in the terminal; and/or determining, by the terminal, the first category of authorized frequencies and the first category of unauthorized frequencies according to frequency information, about authorized frequencies and/or unauthorized frequencies currently used by a cell where the terminal is located, stored in a database; and wherein if there is prior information in the terminal and the prior information comprises the frequency information about the authorized frequencies, then determining, by the terminal, the first category of authorized frequencies and the first category of unauthorized frequencies from the frequency information in the prior information stored in the terminal comprises:

determining, by the terminal, all the authorized frequencies in the prior information as the first category of authorized frequencies;

performing, by the terminal, synchronization to a common control channel of a cell at the first category of authorized frequencies and to obtain frequency information corresponding to adjacent cells; and determining, by the terminal, the first category of unauthorized frequencies according to information about periods of validity of the unauthorized frequencies in the frequency information.

2. The method according to claim 1, wherein if there is prior information in the terminal and the prior information comprises only the frequency information about the unauthorized frequencies, then determining, by the terminal, the first category of authorized frequencies and the first category of unauthorized frequencies among the frequencies supported by the cognitive system according to the frequency information in the prior information stored in the terminal comprises:

determining, by the terminal, that there is no the first category of unauthorized frequencies among the frequencies supported by the cognitive system; and determining, by the terminal, the first category of unauthorized frequencies according to information about periods of validity of the unauthorized frequencies in the frequency information.

3. The method according to claim 1, wherein if there is prior information in the terminal and the prior information comprises the frequency information about the authorized frequencies and the frequency information about the unauthorized frequencies, then determining, by the terminal, the first category of authorized frequencies and the first category of unauthorized frequencies among the frequencies supported by the cognitive system according to the frequency information in the prior information stored in the terminal comprises:

determining, by the terminal, all the authorized frequencies in the prior information as the first category of authorized frequencies; and determining, by the terminal, the first category of unauthorized frequencies according to information about periods of validity of the unauthorized frequencies in the frequency information.

4. The method according to claim 1, wherein if there are a plurality of cells at the first category of authorized frequencies, then performing, by the terminal, synchronization to a common control channel of a cell at the first category of authorized frequencies comprises:

synchronizing to, by the terminal, common control channels of the respective cells in an order of descending signal strengths.

5. The method according to claim 1, wherein determining, by the terminal, the first category of authorized frequencies and the first category of unauthorized frequencies according to the frequency information, about the authorized frequencies and/or the unauthorized frequencies currently used by the cell where the terminal is located, stored in the database comprises:

setting up, by the terminal, a connection with a system serving the database by a preset channel;

transmitting, by the terminal, an access request to the system serving the database to inquire about the authorized frequencies and the unauthorized frequencies, wherein the access request comprises attribute information about the terminal and a frequency information obtainment request; or transmitting, by the terminal, an access request to the system serving the database to inquire about the authorized frequencies and/or the unauthorized frequencies currently used by the cell where the terminal is located, wherein the access request comprises attribute information about the terminal and a frequency information obtainment request; and determining, by the terminal, the first category of authorized frequencies and the first category of unauthorized frequencies according to the received frequency information;

wherein determining, by the terminal, the first category of authorized frequencies and the first category of unauthorized frequencies according to the received frequency information comprises:

determining, by the terminal, the authorized frequencies in the frequency information as the first category of authorized frequencies; and determining, by the terminal, the first category of unauthorized frequencies according to information about periods of validity of the unauthorized frequencies in the frequency information.

6. The method according to claim 1, wherein determining, by the terminal, the first category of unauthorized frequencies comprises:

determining, by the terminal, unauthorized frequencies with the periods of validity that do not expire in the frequency information as the first category of unauthorized frequencies;

determining, by the terminal, spare frequencies corresponding to unauthorized frequencies with the periods of validity that expire in the frequency information as the first category of unauthorized frequencies; and determining, by the terminal, unauthorized frequencies for which no information about the periods of validity is available and their corresponding spare frequencies as the first category of unauthorized frequencies.

7. The method according to claim 1, wherein if there are a plurality of the first category of authorized frequencies determined, then performing, by the terminal, cell search and cell residence at the first category of authorized frequencies comprises: performing, by the terminal, cell search and cell residence at the respective first category of authorized frequencies in an order of descending of channel qualities;

if there are a plurality of the first category of unauthorized frequencies determined, then performing, by the terminal, cell search and cell residence at the first category of unauthorized frequencies comprises: performing, by the terminal, cell search and cell residence at the respective first category of unauthorized frequencies in an order of descending of channel qualities;

if there are a plurality of the second category of authorized frequencies determined, then performing, by the terminal, cell search and cell residence at the second category of authorized frequencies comprises: performing, by the terminal, cell search and cell residence at the respective second category of authorized frequencies in an order of descending of channel qualities; and if there are a plurality of the second category of unauthorized frequencies determined, then performing, by the terminal, cell search and cell residence at the second category of unauthorized frequencies comprises: performing, by the terminal, cell search and cell residence at the respective second category of unauthorized frequencies in an order of descending of channel qualities.

8. The method according to claim 1, wherein performing, by the terminal, cell search and cell residence at the frequencies supported by the cognitive system comprises:

stopping, by the terminal, searching for a cell after failing to reside at a cell at the determined first category of authorized frequencies, first category of unauthorized frequencies, second category of authorized frequencies and second category of unauthorized frequencies; and performing, by the terminal, cell search and cell residence again at the respective frequencies of the cognitive system in an order of descending priorities after a preset length of time.

9. A device for searching for a cell in a cognitive system, wherein the device comprises:
one or more processors; and
a memory, wherein:
the memory stores therein one or more computer readable program codes, and the processor or processors are configured to execute the one or more computer readable program codes to perform:
determining different categories of frequencies among frequencies supported by the cognitive system, wherein frequencies of the cognitive system are categorized into a first category of authorized frequencies, a first category of unauthorized frequencies, a second category of authorized frequencies and a second category of unauthorized frequencies in an order of descending priorities; and
performing cell search and cell residence at the frequencies supported by the cognitive system in an order of descending priorities;
wherein the second category of authorized frequencies comprises other authorized frequencies than the first category of authorized frequencies among the authorized frequencies supported by the cognitive system; and the second category of unauthorized frequencies comprises other unauthorized frequencies than the first category of unauthorized frequencies among the unauthorized frequencies supported by the cognitive system;
determining the first category of authorized frequencies and the first category of unauthorized frequencies according to frequency information in prior information stored in the device;
determining the first category of authorized frequencies and the first category of unauthorized frequencies according to frequency information, about authorized frequencies and/or unauthorized frequencies currently used by a cell where the device is located, stored in a database; and
if there is prior information in the device and the prior information comprises the frequency information about the authorized frequencies, determining all the authorized frequencies in the prior information as the first category of authorized frequencies; synchronizing the device to a common control channel of a cell at the first category of authorized frequencies and obtaining frequency information corresponding to adjacent cells; and determining the first category of unauthorized frequencies according to information about periods of validity of the unauthorized frequencies in the obtained frequency information.

10. The device according to claim 9, wherein the one or more processors are configured to execute the one or more computer readable program codes to perform:
if there is prior information in the device and the prior information comprises only the frequency information about the unauthorized frequencies, determining that there is no the first category of unauthorized frequencies among the frequencies supported by the cognitive system; and determining the first category of unauthorized frequencies according to information about periods of validity of the unauthorized frequencies in the frequency information.

11. The device according to claim 9, wherein the one or more processors are configured to execute the one or more computer readable program codes to perform:
if there is prior information in the device and the prior information comprises the frequency information about the authorized frequencies and the frequency information about the unauthorized frequencies, determining all the authorized frequencies in the prior information as the first category of authorized frequencies; and determining the first category of unauthorized frequencies according to information about periods of validity of the unauthorized frequencies in the frequency information.

12. The device according to claim 9, wherein the one or more processors are configured to execute the one or more computer readable program codes to perform:
if there are a plurality of cells at the first category of authorized frequencies, synchronizing to common control channels of the respective cells in an order of descending signal strengths.

13. The device according to claim 9, wherein the one or more processors are configured to execute the one or more computer readable program codes to perform:
setting up a connection with a system serving the database by a preset channel; transmitting an access request to the system serving the database to inquire about the authorized frequencies and the unauthorized frequencies; and determining the first category of authorized frequencies and the first category of unauthorized frequencies according to the received frequency information;
wherein the access request comprises attribute information about the device and a frequency information obtainment request; or
the one or more processors are configured to execute the one or more computer readable program codes to perform:
setting up a connection with a system serving the database over a preset channel; transmitting an access request to the system serving the database to inquire about the authorized frequencies and/or the unauthorized frequencies currently used by the cell where the device is located; and determining the first category of authorized frequencies and the first category of unauthorized frequencies according to the received frequency information;
wherein the access request comprises attribute information about the device and a frequency information obtainment request;
wherein the one or more processors are configured to execute the one or more computer readable program codes to perform:
determining the authorized frequencies in the frequency information as the first category of authorized frequencies; and determining the first category of unauthorized frequencies according to information about periods of validity of the unauthorized frequencies in the frequency information.

14. The device according to claim 9, wherein the one or more processors are configured to execute the one or more computer readable program codes to perform:
determining unauthorized frequencies with the periods of validity that do not expire in the frequency information as the first category of unauthorized frequencies; determining spare frequencies corresponding to unauthorized frequencies with the periods of validity that expire in the frequency information as the first category of unauthorized frequencies; and determining unauthorized frequencies for which no information about the periods of validity is available and their corresponding spare frequencies as the first category of unauthorized frequencies.

15. The device according to claim 9, wherein the one or more processors are configured to execute the one or more computer readable program codes to perform:

if there are a plurality of the first category of authorized frequencies determined, performing cell search and cell residence at the respective first category of authorized frequencies in an order of descending of channel qualities;

if there are a plurality of the first category of unauthorized frequencies determined, performing cell search and cell residence at the respective first category of unauthorized frequencies in an order of descending of channel qualities;

if there are a plurality of the second category of authorized frequencies determined, performing cell search and cell residence at the respective second category of authorized frequencies in an order of descending of channel qualities; and if there are a plurality of the second category of unauthorized frequencies determined, performing cell search and cell residence at the respective second category of unauthorized frequencies in an order of descending of channel qualities.

16. The device according to claim 9, wherein the one or more processors are configured to execute the one or more computer readable program codes to perform:

after failing to reside at a cell at the determined first category of authorized frequencies, first category of unauthorized frequencies, second category of authorized frequencies and second category of unauthorized frequencies, stopping searching for a cell; and performing cell search and cell residence again at the respective frequencies in the cognitive system in an order of descending priorities after a preset length of time.

* * * * *